Nov. 29, 1955 S. J. HELLINGS 2,725,557

RADAR APPARATUS COMPRISING A RECEIVER THE GAIN OF WHICH VARIES PERIODICALLY

Filed Sept. 10, 1952

INVENTOR.

SIMON JACOB HELLINGS

BY Fred M Vogel

AGENT 2,725,557
Patented Nov. 29, 1955

2,725,557

RADAR APPARATUS COMPRISING A RECEIVER THE GAIN OF WHICH VARIES PERIODICALLY

Simon Jacob Hellings, Hilversum, Netherlands, assignor to Hartford National Bank and Trust Company, Hartford, Conn., as trustee Application September 10, 1952, Serial No. 308,865

Claims priority, application Netherlands October 9, 1951

4 Claims. (Cl. 343—17.1)

This invention relates to a radar apparatus comprising a receiver the gain of which is reduced at each transmitting pulse under the control of a saw-tooth control voltage and gradually increases in the time interval between successive transmitting pulses ("swept-gain") so as to substantially block the receiver during the occurrence of a transmitting pulse and to cause the receiver gain gradually to increase between successive transmitting pulses so as partially to compensate for the amplitude difference between echopulses obtained from nearby and distant objects.

It is known to abstract the sawtooth control voltage pulses in such apparatus from a sawtooth generator having a capacitor connected to a charging voltage source, said capacitor being periodically discharged across a discharge tube which is made conductive periodically by synchronizing pulses.

The object of the invention is to provide such apparatus with a sawtooth generator which is constructed so as to have material practical advantages.

According to the invention, in devices of the type described above the sawtooth control voltage is obtained from a series resistor included in the capacitor discharge circuit and connected between the capacitor and a gas discharge tube which is periodically triggered by the synchronizing pulses.

In contradistinction to standard constructions the leading edge of the control voltage pulses produced is very steep, and the internal resistance of the sawtooth generator, viewed from the output terminals, is comparatively low so that if the sawtooth generator and the receiver are arranged to be remote from each other it is possible for the control voltage to be fed to the latter by way of a matched cable without further expedients. Stray capacities of the control voltage conductor or cable are thus substantially prevented from affecting the shape of the control voltage pulses and even the very steep leading edges thereof.

Both the input and the output circuits of the sawtooth generator can be connected to earth potential if of the series combination of capacitor and series resistor the capacitor is connected to the anode of the gas discharge tube and by way of a charging resistor to the charging voltage source and the series resistor is connected to a grounded cathode resistor of the gas discharge tube.

In addition, in the circuit arrangement according to the invention the amplitude and the duration of the control voltage pulses can be controlled independently of each other by constituting the series resistor by an adjustable potentiometer resistor and a variable resistor connected in parallel therewith. In order to prevent the gain of the receiver from being insufficiently reduced during the transmitting pulses at a minimum amplitude of the control voltage pulse a peaking capacitor may be connected between the point connecting the capacitor and the series resistor and a fixed tapping point of the potentiometer resistor.

Figure 1:
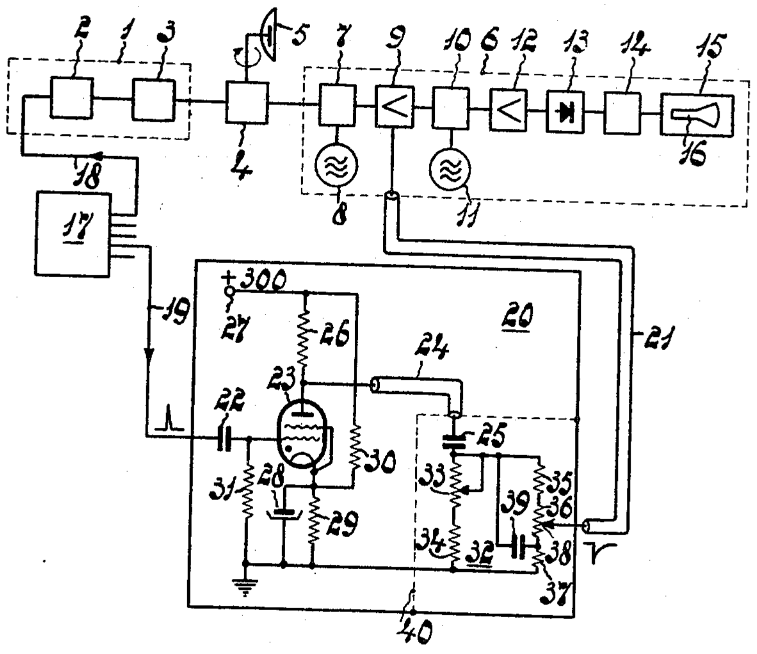
Figure 2:
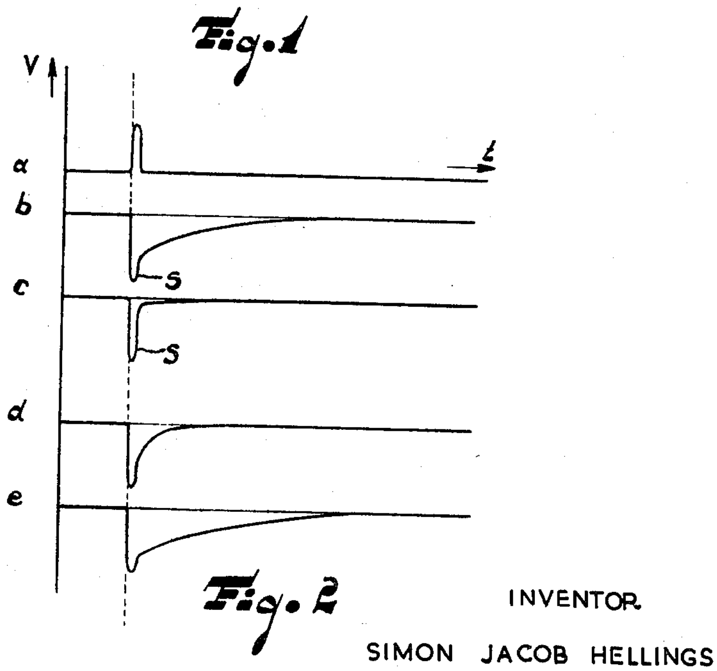

In order that the invention and its advantages may be clearly understood and readily carried into effect it will now be described in detail with reference to the accompanying drawing, in which Fig. 1 shows a radar apparatus according to the invention partly in block diagram form and, Fig. 2 shows voltage-time diagrams to illustrate the operation of the sawtooth generator.

The radar apparatus shown in Fig. 1 comprises a transmitter 1 having a pulse modulator 2 and a magnetron-output stage 3 energized thereby which is connected by way of a TR-switch 4 to a rotary aerial 5. Also connected to the TR-switch 4 is a radar receiver 6 comprising in succession a first mixer 7 having a local oscillator 8, a first intermediate frequency amplifier 9, a second mixer 10 having a local oscillator 11, a second intermediate frequency amplifier 12, a detector 13, a video frequency amplifier 14 and an indicator 15 having a diagrammatically shown panorama indicator (P. P. I.) 16. The radar apparatus contains as usual a time distributor 17 for the supply of synchronizing pulses to various separate parts of the apparatus, for example by way of conductor 18 to the pulse modulator 2 of the radar transmitter and by way of conductor 19 to a sawtooth generator 20 to be discussed hereinafter.

The sawtooth generator 20 serves for the production of sawtooth control voltage pulses which by way of a cable 21 are fed to the first intermediate frequency amplifier 9 of the radar receiver and serve to reduce the gain of the receiver during the occurrance of a transmitting pulse and to cause it gradually to return to a maximum value in the time interval between successive transmitting pulses.

Positive-going synchronising pulses derived from the time distributor 17 are fed by way of a grid capacitor 22 to the control grid of a gas discharge tube 23 constructed as a tetrode and normally cut off. The anode of the gas discharge tube 23 is connected by way of a screened conductor 24 to a capacitor 25 required to be discharged periodically and by way of a charging resistor 26 to the positive input terminal 27 of an anode voltage source. The cathode of the tube is connected to earth potential by way of a cathode resistor 29 shunted by a capacitor 28. The cathode resistor forms part of a potentiometer (resistors 29 and 30) which is connected to the anode voltage source, so as to bias the control grid of the tube, which grid is connected to earth potential by way of a grid resistor 31, such that the tube is cut off normally.

The capacitor 25 and the grounded end of cathode capacitor 29 have interconnected between them a composite series resistor 32. This composite series resistor is included in the discharge circuit of capacitor 25 and thus passes the entire discharge current of the capacitor 25 on the gas discharge tube 23 being triggered. The composite series resistor comprises two parallel branches one of which contains a variable resistor 33 in series with a fixed resistor 34, whereas the other branch contains the series combination of a fixed resistor 35, a variable potentiometer resistor 36 and a further fixed resistor 37. The control voltage pulses are derived from the variable tapping point 38 of potentiometer resistor 36 and are fed to one or more stages of the first intermediate frequency amplifier by way of a cable 21.

Whenever the positive-going synchronizing pulse is fed, by way of the conductor 19, to the sawtooth generator 20 the gas discharge tube 23 is triggered and the capacitor 25 initially charged to the entire anode voltage is discharged across the gas discharge tube and the composite series resistor 32. Since the internal resistance of the gas discharge tube is only a few ohms in the ignited condition, the ohmic resistance of the composite series resistor 32 may be comparatively low without inconvenience, for example from 50 to 100 ohms, with the result that the internal resistance of the sawtooth generator, viewed from the control voltage conductor 21, is low enough for the latter to be enabled to be connected directly to the composite series resistor without particular impedance-matching measures.

Whenever the gas discharge tube is triggered, the discharge current of capacitor 25 increases very rapidly up to a maximum value and likewise the negative-going voltage pulse thus occurring across the composite series resistor 32, as may be seen from the oscillograms in Fig. 2*a* to *e*. Fig. 2*a* shows the synchronizing pulse fed to the control grid of the gas discharge tube 23 having, for example, a duration of 1 microsec. whereas Figs. 2*b* to *e* show oscillograms of control voltage pulses thus produced of different duration and amplitude.

The amplitude of the control voltage pulses obtained can be adjusted by adjustment of the tapping point 38 of potentiometer resistor 36. Fig. 2*b* shows a control voltage pulse of maximum amplitude of Fig. 2*c* a control voltage pulse of minimum amplitude. In the last-mentioned case there is the risk that during the occurrence of the transmitting pulse, which coincides with the synchronizing pulse shown in Fig. 2*a*, the amplitude of the control voltage pulse may be insufficient for substantially cutting off the first intermediate frequency amplifier 9. In order to obviate this difficulty with certainty, the resistors 35 and 36 are shunted by a peaking capacitor 39 with the result that irrespective of the adjustment of the tapping point 38 of potentiometer resistor 36 the control voltage pulse exhibits a spike as shown in the oscillograms at *s*.

For the control of the duration of the control voltage pulses produced the time constant of the discharge circuit of capacitor 25 is capable of being adjusted by the variable resistor 33. Fig. 2*c* shows a control voltage pulse at a low time constant of the discharge circuit and Fig. 2*e* shows a control voltage pulse at a maximum time constant of the discharge circuit.

It has been found that if the values of the resistors 33 to 37 are suitably chosen, the amplitude and duration of the control voltage pulses can be varied substantially independently of each other.

The capacitor 25 and the composite series resistor 32 including the peaking capacitor 39 may, if desired, be arranged so as to be separated from the remaining part of the sawtooth generator 22, as is denoted by a broken line 40. In addition said part may be housed in the central control panel of the radar apparatus.

In a practical embodiment of the sawtooth generator described employing a gas discharge tube of the type Philips PI21 the resistors 33 to 37 and the capacitor 39 had the following values:

$R_{33}$=500 ohms.
$R_{34}$=22 ohms.
$R_{35}$=2200 ohms.
$R_{36}$=500 ohms.
$R_{37}$=22 ohms.
$C_{39}$=1500 pf.

What I claim is:

1. In a radar system including a receiver in which the gain is reduced at the instant of emission of each pulse from the system and is gradually increased in the time interval between successively emitted pulses under the control of a sawtooth control voltage, apparatus comprising a sawtooth generator including a first capacitor, circuit means for charging said capacitor and a capacitor discharge circuit including a gas discharge device and a series resistor connected between said capacitor and said gas discharge device, means for applying synchronizing pulses to said discharge device to periodically trigger same for discharging said capacitor, and means for deriving said sawtooth control voltage from said resistor.

2. Apparatus, as set forth in claim 1, wherein said gas discharge device includes an anode and a cathode, said sawtooth generator further includes a grounded cathode resistor, and said circuit means includes a charging voltage source and a charging resistor, the end of said capacitor remote from said series resistor being connected to said anode and through said charging resistor to said source, the end of said series resistor remote from said capacitor being connected to said grounded cathode resistor.

3. Apparatus, as set forth in claim 2, wherein said series resistor is constituted by a variable potentiometer resistor and a variable resistor connected in parallel therewith for independently controlling the amplitude and the duration, respectively, of the control voltage pulses.

4. Apparatus, as set forth in claim 3, further including a peaking capacitor, said peaking capacitor being connected between a fixed tapping point of said potentiometer resistor and the junction point between said first capacitor and said series resistor.

References Cited in the file of this patent

UNITED STATES PATENTS

| | | |
|---|---|---|
| 2,602,922 | Maynard | July 8, 1952 |
| 2,624,871 | Meagher | Jan. 6, 1953 |
| 2,624,875 | Patterson | Jan. 6, 1953 |